(12) United States Patent
Gerlin et al.

(10) Patent No.: US 11,820,186 B2
(45) Date of Patent: Nov. 21, 2023

(54) DAMPER SYSTEM AND METHOD FOR CHANGING A GROUND CLEARANCE OF A VEHICLE

(71) Applicant: Volvo Car Corporation, Gothenburg (SE)

(72) Inventors: Liam Gerlin, Gothenburg (SE); Nrupathunga Ashok, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/878,973

(22) Filed: Aug. 2, 2022

(65) Prior Publication Data

US 2023/0076779 A1 Mar. 9, 2023

(30) Foreign Application Priority Data

Sep. 8, 2021 (EP) ..................................... 21195485

(51) Int. Cl.
*B60G 17/015* (2006.01)
*B60G 15/06* (2006.01)

(52) U.S. Cl.
CPC ....... *B60G 17/0152* (2013.01); *B60G 15/063* (2013.01); *B60G 2202/312* (2013.01);
(Continued)

(58) Field of Classification Search
CPC .............. B60G 17/0152; B60G 15/063; B60G 2202/312; B60G 2500/30; B60G 2800/914; B60G 2204/1242

(Continued)

(56) References Cited

U.S. PATENT DOCUMENTS

| 5,181,696 A | * | 1/1993 | Abe ....................... B62K 25/04 267/221 |
| 5,556,082 A | * | 9/1996 | Takasaki ............ B60G 17/0272 267/218 |

(Continued)

FOREIGN PATENT DOCUMENTS

| GB | 2378231 A | * | 2/2003 | .............. F16F 9/325 |
| JP | S63159184 A | | 7/1988 | |

(Continued)

OTHER PUBLICATIONS

JP 3108078 B2, English Translation and Original Document, retrieved 2023 (Year: 2000).*

(Continued)

*Primary Examiner* — Paul N Dickson
*Assistant Examiner* — Caitlin Anne Miller
(74) *Attorney, Agent, or Firm* — Clements Bernard Walker; Christopher L. Bernard

(57) ABSTRACT

A damper system for changing a ground clearance of a vehicle, including a main damper having a main damper chamber and a main damper piston movably arranged in a main damper tube and a spring assembly. The spring assembly includes a spring, a lower spring seat, and an upper spring seat. The spring is arranged between the lower spring seat and the upper spring seat, wherein one of the lower spring seat and the upper spring seat includes a cylinder and a piston, and the other one of the lower spring seat and the upper spring seat is coupled to the main damper and movable with the spring. The piston of the spring assembly is steplessly adjustable between a first position and a second position, wherein the first position corresponds to a predefined minimum ground clearance and the second position corresponds to a predefined maximum ground clearance.

15 Claims, 5 Drawing Sheets

(52) U.S. Cl.
CPC .. *B60G 2204/1242* (2013.01); *B60G 2500/30* (2013.01); *B60G 2800/914* (2013.01)

(58) Field of Classification Search
USPC ...................................................... 280/6.157
See application file for complete search history.

(56) References Cited

U.S. PATENT DOCUMENTS

| | | | | |
|---|---|---|---|---|
| 8,702,109 | B2 * | 4/2014 | Ryan ...................... | B60G 17/00 |
| | | | | 280/5.514 |
| 8,763,639 | B2 * | 7/2014 | Cook ...................... | F16F 9/346 |
| | | | | 188/266.5 |
| 8,844,944 | B1 * | 9/2014 | Murakami ............. | B62K 25/00 |
| | | | | 280/5.514 |
| 8,864,146 | B2 * | 10/2014 | Murakami ............... | B60G 3/01 |
| | | | | 280/6.157 |
| 8,978,847 | B2 * | 3/2015 | Atsushi ............. | B60G 17/0416 |
| | | | | 188/266.5 |
| 2005/0199457 | A1 | 9/2005 | Beck | |
| 2012/0018263 | A1 * | 1/2012 | Marking ................ | B60G 13/08 |
| | | | | 188/266.2 |
| 2014/0077466 | A1 | 3/2014 | Murakami et al. | |

FOREIGN PATENT DOCUMENTS

| | | | | |
|---|---|---|---|---|
| JP | | 3108078 B2 * | 11/2000 | |
| JP | | 6482909 B2 * | 3/2019 | ........... B60G 15/062 |
| WO | WO-2019219449 A1 * | | 11/2019 | .............. F16F 9/062 |

OTHER PUBLICATIONS

GB 2378231 A, English Translation and Original Document, retrieved 2023 (Year: 2003).*

JP 6482909 B2, English Translation and Original Document, retrieved 2023 (Year: 2019).*

Feb. 22, 2022 European Search Report issued in International Application No. 21/195,485.

* cited by examiner

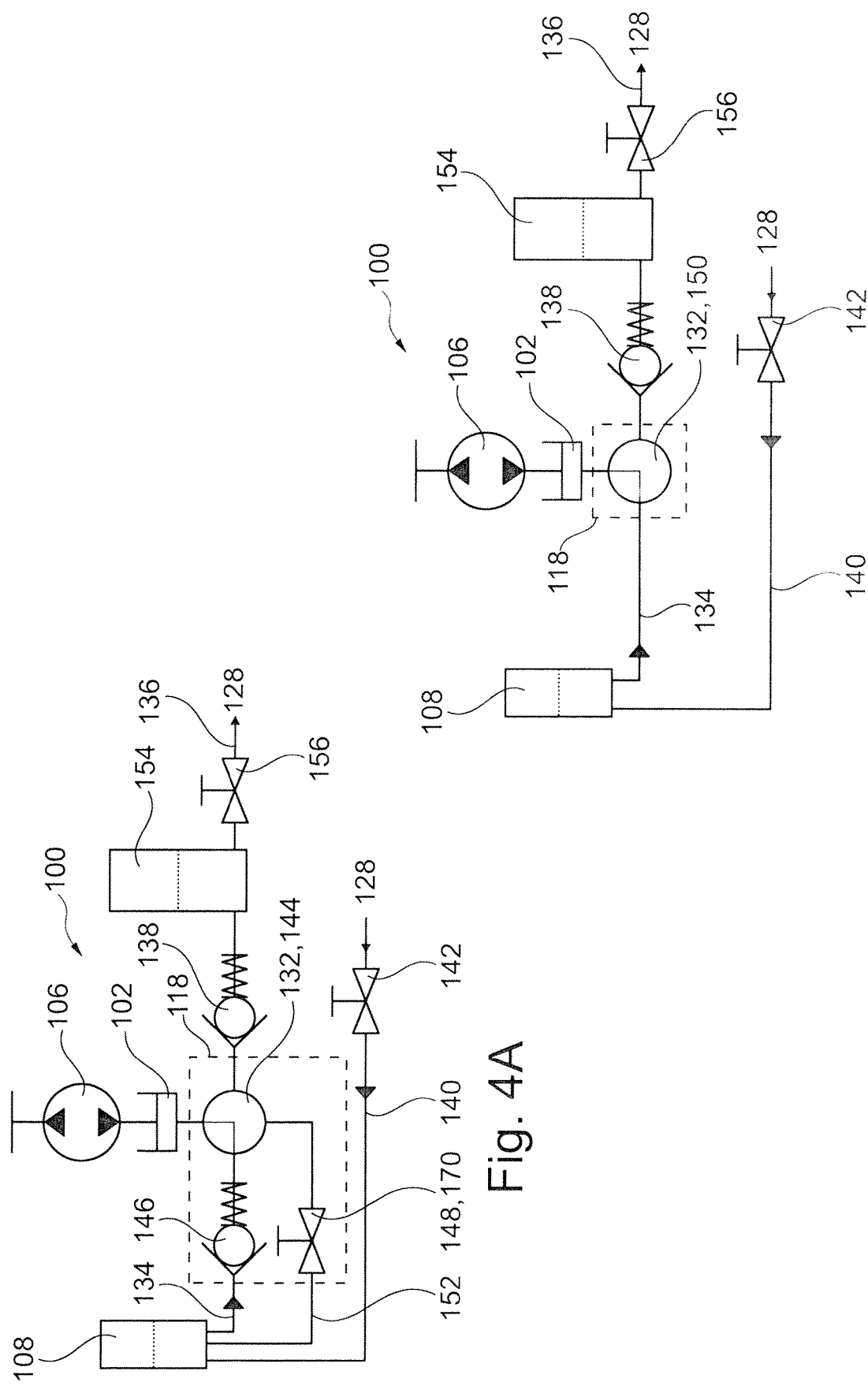

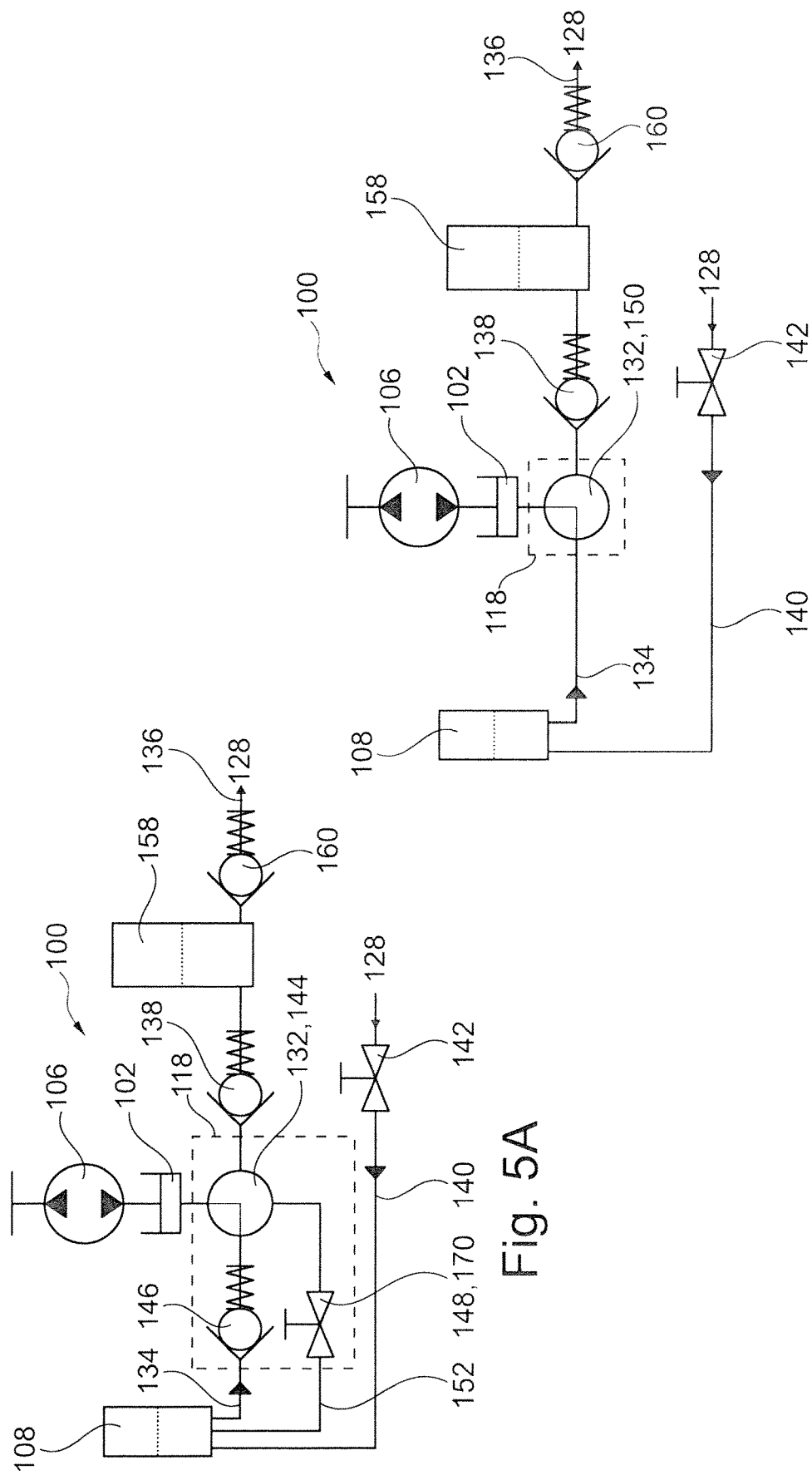

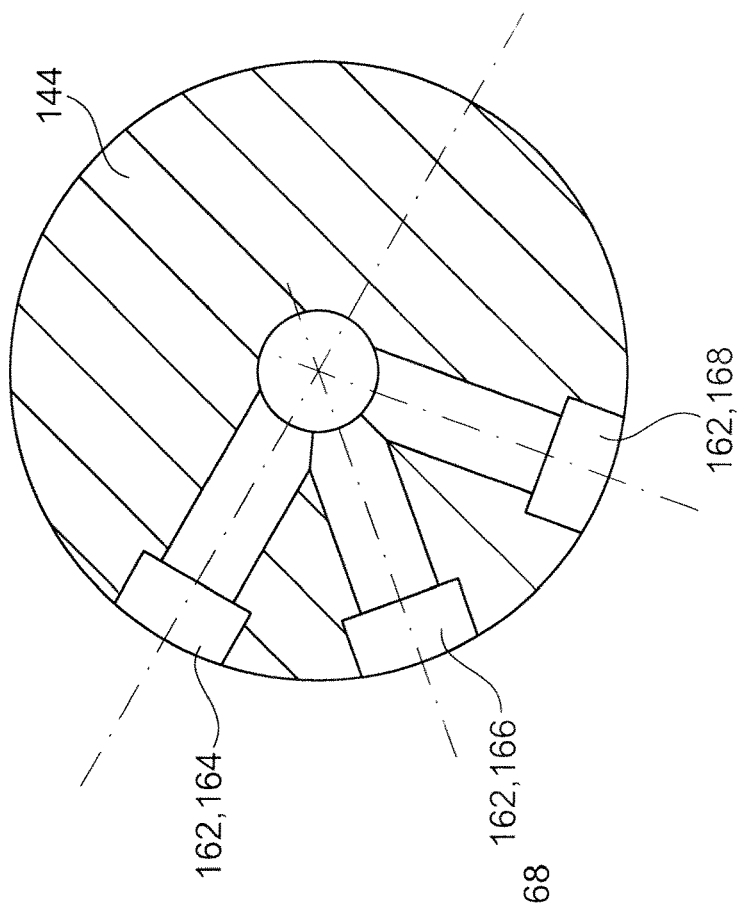
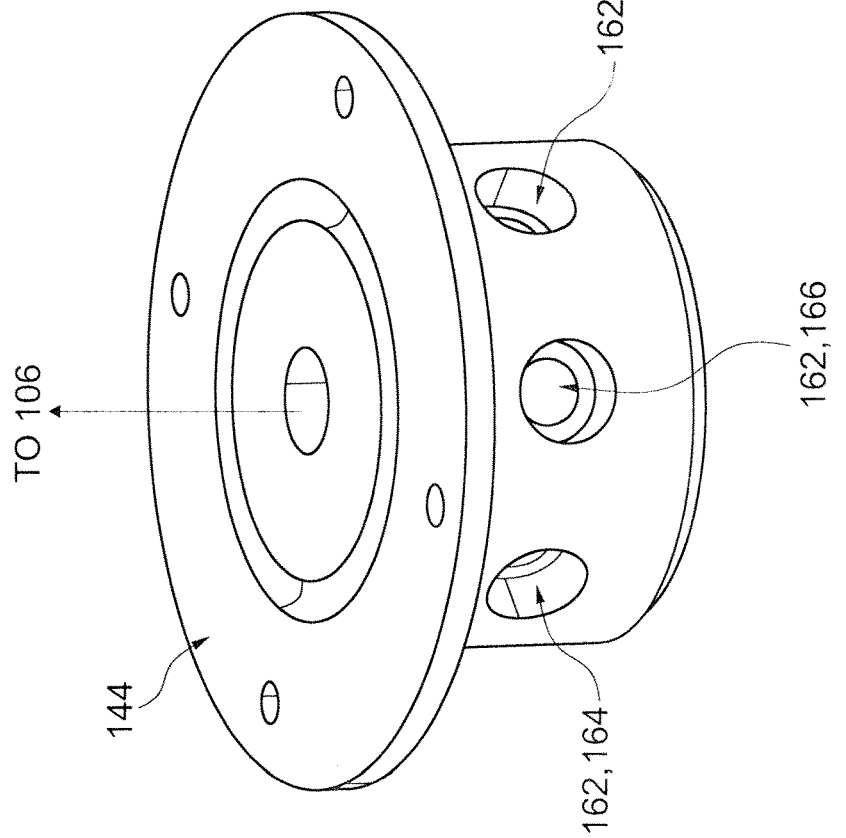

DAMPER SYSTEM AND METHOD FOR CHANGING A GROUND CLEARANCE OF A VEHICLE

CROSS-REFERENCE TO RELATED APPLICATION

The present disclosure claims the benefit of priority of co-pending European Patent Application No. 21 195 485.4, filed on Sep. 8, 2021, and entitled "DAMPER SYSTEM AND METHOD FOR CHANGING A GROUND CLEARANCE OF A VEHICLE," the contents of which are incorporated in full by reference herein.

TECHNICAL FIELD

The present disclosure relates to a damper system for changing a ground clearance of a vehicle and a method for changing a ground clearance of a vehicle.

BACKGROUND

Systems for changing a ground clearance of a vehicle, also known as leveling or ride height adjustment systems, are configured to raise and/or lower a vehicle during driving. The capability of adjusting the height or a ground clearance of a vehicle is used to increase efficiency of the vehicle. Lowering the height, thus reducing the ground clearance, significantly reduces aerodynamic drag at high speed. A higher ground clearance is preferred during urban driving to avoid bottoming, e.g. on entry/exit ramps in parking spaces, on curbs, on speed bumps etc.

Presently used systems are usually based on air suspension and therefore bulky, because such systems require external circuits with pumps, hoses etc. Additionally such systems are expensive and/or require a high amount of external energy.

SUMMARY

There may, therefore, be a need to provide an improved damper system and/or method for changing a ground clearance of a vehicle, particularly a damper system and/or method for changing a ground clearance of a vehicle capable of providing a compact and/or energy efficient and/or simple way of changing the ground clearance of the vehicle.

According to a first aspect, there is provided a damper system for changing, particularly reducing and/or increasing, a ground clearance of a vehicle. The damper system includes a main damper, particularly a main damper tube, having a main damper chamber and a main damper piston movably arranged in the main damper tube and a spring assembly. The spring assembly includes a spring, a lower spring seat, and an upper spring seat. The spring is arranged between the lower spring seat and the upper spring seat, wherein one of the lower spring seat and the upper spring seat includes a cylinder and a piston, the piston being movably accommodated in the cylinder, and the other one of the lower spring seat and the upper spring seat is coupled to the main damper and movable with the spring. The piston of the spring assembly is adjustable, in particular steplessly adjustable, in position between a first, or lower, position and a second, or upper, position, wherein the first position corresponds to a predefined minimum ground clearance and the second position corresponds to a predefined maximum ground clearance.

Further, the damper system includes a pumping chamber and a low pressure reservoir. The pumping chamber is accommodated in the main damper tube and configured to increase the pressure of a fluid, e.g. oil to high pressure. The low pressure reservoir is configured to reduce the pressure of the fluid to low pressure and to, at least temporarily, store at least a part of the fluid having low pressure. The pumping chamber is connected to a valve unit, which is arranged at a bottom of the main damper tube. The valve unit at least includes a first electronically controlled valve, which is configured to connect/couple the pumping chamber with the low pressure reservoir via a first low pressure line during an extension stroke of the main damper, and/or directly or non-directly connect/couple the pumping chamber with the cylinder of the spring seat via a high pressure line during a compression stroke of the main damper.

Further, a first one-way valve, e.g. check valve, is arranged in the high pressure line configured to stop the fluid from flowing backwards into the valve unit, and the low pressure reservoir is connected/coupled to the cylinder of the spring seat by a second electronically controlled valve.

By pumping the fluid into the cylinder of the spring seat using the compression stroke of the main damper, the damper system raises the piston of the spring seat and hence the vehicle to a predefined position. Thus, the damper system uses a relative motion between the wheel and the chassis of the vehicle to pump the fluid into the cylinder of the spring seat for raising the vehicle. For lowering the spring seat and hence the vehicle, the fluid is guided from the cylinder of the spring seat to the low pressure reservoir, resulting in a pressure release in the spring seat. A damping force, which is required to maintain ride comfort and tire contact with the ground is provided by forcing oil through orifices in the main damper. Thus, the damper system substantially works without requiring any external energy, only by using the energy being released by the relative movement between the wheel and the chassis. In other words, the damper system uses the energy from the extension and/or compression strokes of the main damper, which has to be damped, for pumping the fluid into the cylinder of the spring seat without negatively affecting the damping function. Otherwise, this energy would be converted into heat dissipating to the environment. Only a small external current is required to operate the electronically controlled valves. Hence, the damper system is very compact and the required energy, e.g. for controlling the valves, is significantly reduced.

The first electronically controlled valve is configured to control the fluid flow in the body of the main damper tube, particularly in the pumping chamber. During an extension stroke, the first electronically controlled valve connects the pumping chamber to the low pressure reservoir thereby creating a vacuum in the pumping chamber, which draws fluid from the low pressure reservoir into the pumping chamber. During a compression stroke, the first electronically controlled valve connects the pumping chamber to the high pressure line forcing the fluid out of the pumping chamber and directly or indirectly into the cylinder of the spring seat.

The second electronically controlled valve controls the fluid flow from the cylinder of the spring seat to the low pressure reservoir, wherein opening the second electronically controlled valve allows the fluid draining from the cylinder of the spring seat into the low pressure reservoir, thereby lowering the spring seat and the vehicle ground clearance.

Further, the electronically controlled valves may be used to regulate a damping force inside the main damper by restricting a fluid flow between reservoirs, thereby enabling further possibilities with regard to continuously controlled damping (CCD).

Low pressure herein is defined as pressure equal to or higher than atmospheric pressure, but significantly lower than the high pressure as generated by the pumping chamber.

In other words, the damper system allows changing the ground clearance in a compact, cost-reduced, energy-efficient and relatively simple way, and therefore can be used in all vehicles independent of their price-category. This means, the use of such damper system is not only limited on high-priced vehicles, but is also affordable to be integrated in middle-prices and/or even in low-priced vehicles.

Furthermore, the efficiency of the damper system allows using the overall energy saving, e.g. from lowering the vehicle, for other things than raising the vehicle, e.g. for extending an ultimate range of the vehicle.

According to an embodiment, the first electronically controlled valve may be a mechanical valve, and the valve unit may further include a one-way valve and a solenoid valve. The one-way valve may be arranged in a first low pressure line connecting the low pressure reservoir and the mechanical valve, and may be configured to stop the fluid in the pumping chamber from flowing backwards into the low pressure reservoir. The solenoid valve may be arranged in a second low pressure line connecting the low pressure reservoir and the mechanical valve, and may be configured to be closed to increase the ground clearance of the vehicle, and may be configured to be open to maintain the ground clearance of the vehicle at a predefined level. In other words, the solenoid valve may be configured to be closed during a pumping state, in which the fluid is pumped into the cylinder to pressurize the cylinder, and thereby, to increase the ground clearance, for raising the vehicle. Further, the solenoid valve may be configured to be open during a non-pumping state, in which no fluid is pumped into the cylinder, e.g. during "normal" driving corresponding to a state, in which the ground clearance of the vehicle is kept constant during driving.

The mechanical valve is a very compact, energy efficient valve, which does not require any separated drive unit, e.g. a motor. Additionally, the mechanical valve is configured to react immediately, thus, there is no delay between controlling the mechanical valve and the respective reaction or response of the mechanical valve. The solenoid valve may be configured to selectively provide a path of least resistance for the fluid thereby enabling the no-pumping state. Thus, the solenoid valve may be closed during pumping, this means, during a compression stroke and/or an expansion stroke of the main damper to increase the ground clearance of the vehicle, and may be opened, when only the damping is active, but no pumping is done. This means, the open solenoid valves may allow the fluid flowing freely between the pumping chamber and the low pressure reservoir. In particular, the fluid in the low pressure reservoir may be sucked into the pumping chamber during an expansion stroke of the main damper, and during a compression stroke of the main damper, the fluid in the pumping chamber is forced back into the low pressure reservoir. The check valve may allow drawing the fluid from the low pressure reservoir and pumping the fluid into the cylinder without needing any additional moving parts.

The first electronically controlled valve in accordance with the present disclosure may be a rotary valve.

The rotary valve may unite the functions of the mechanical valve, the solenoid valve and the one-way valve, thus reduces the total amount of components included in the valve unit. Further, the rotary valve may have a motor for switching/turning the rotary valve into positions.

Further, the first electronically controlled valve may be configured to be switchable between the high pressure line and the low pressure line during compression and extension (or rebound) stroke of the damper system, respectively.

The first electronically controlled valve may be connected to the high pressure line in a high pressure state, in which pumping the fluid out of the pumping chamber towards the cylinder of the spring seat is active. Further, the first electronically controlled valve may be connected to the low pressure line in a low pressure state, in which a vacuum is created in the pumping chamber drawing the fluid from the low pressure reservoir into the pumping chamber. In the high pressure state, by raising the piston of the spring seat, the spring may be caused to compress a fraction of its length more than it would during the compression stroke of the main damper. During the extension stroke, particularly, when the second electronically controlled valve is closed, the piston of the spring seat may maintain its position, but the main damper may extend, thereby extending the space between the upper and the lower spring seat. Thus, the spring may be allowed extending a fraction of its length more, and thereby raises the vehicle, namely increases the ground clearance of the vehicle, particularly to a normal ride height of the vehicle for urban driving.

Moreover, the second electronically controlled valve may be configured to connect the cylinder of the spring seat with the low pressure reservoir for lowering the ground clearance of the vehicle.

In particular, the second electronically controlled valve is opened, thus allows draining the fluid from the cylinder of the spring seat into the low pressure reservoir, thereby releasing the pressure from the cylinder resulting in lowering the piston of the spring seat and hence, the vehicle. In other words, by draining the fluid from the cylinder of the spring seat into the low pressure reservoir, the ground clearance of the vehicle is reduced, particularly to a ride height of the vehicle for highway driving.

The first electronically controlled valve may be configured to directly connect the cylinder of the spring seat with the pumping chamber for increasing the ground clearance of the vehicle.

The damper assembly described above may allow directly connecting the pumping chamber with the cylinder of the spring seat, thereby improving the efficiency and/or reducing production and maintenance costs.

Further, the damper system may further include a high pressure accumulator configured to store a predefined amount of the fluid under, particularly high, pressure, when the ground clearance of the vehicle is at a predefined minimum position. The accumulator may be arranged in the high pressure line between the first one-way valve and the cylinder of the spring seat.

Such assembly may allow the fluid to be pumped and/or stored in the accumulator, when the vehicle is in a lowered position, e.g. during highway driving. Then, in case, the vehicle may have to be raised, e.g. for an urban driving scenario, the vehicle may be raised to the predefined raised vehicle height immediately. Thus, the accumulator may enable raising the vehicle, if required, without any delay, even at standstill. Since the fluid is stored under pressure, particularly under high pressure, the accumulator may additionally offer possibilities of extended functions, such as crash mitigation by lowering and/or raising vehicle corners during imminent collision. Further, the valve unit may be configured to adapt the damping force of the damper system.

The predefined amount of the fluid may correspond to an amount of the fluid required to move the piston of the spring seat from the first position to the second position.

Thus, the accumulator may allow raising the vehicle at standstill from the lowest possible position, thus, from the minimum ground clearance, in the accumulator, to the highest possible position, thus, to the maximum ground clearance.

According to an embodiment, the damper system may further include a solenoid valve being arranged between the accumulator and the cylinder of the spring seat. The solenoid valve may be configured to be closed to stop the fluid in the cylinder of the spring seat from flowing backwards into the accumulator. Thereby, the ground clearance may be maintained in its current position, e.g. during high speed driving. Additionally, or alternatively, the solenoid valve may be configured to be open to allow the fluid flowing from the accumulator into the cylinder. Thereby, the ground clearance may be increased, e.g., when leaving a high way and entering an urban driving environment.

Thus, the fluid may be prevented from flowing back into the accumulator, thereby maintaining the position of the spring seat during the expansion stroke of the main damper. By this, the position of the spring seat, and consequently, the respective ground clearance of the vehicle is ensured.

According to an alternative embodiment, the damper system may further include a buffer configured to store a predefined amount of the fluid under pressure. The buffer may be arranged in the high pressure line between the first one-way valve and the cylinder of the spring seat.

The fluid may be pumped into the buffer during the compression stroke of the main damper and during the expansion stroke of the main damper, the fluid may be pumped from the buffer into the cylinder of the spring seat. This may reduce the required pressures, because the forces during the expansion stroke are comparatively lower as the spring and/or mass are doing part of the lifting work.

The predefined amount of fluid may correspond to a portion of the entire amount of fluid being required to move the piston of the spring seat from the first position to the second position.

Thus, the buffer may be smaller than the accumulator, thereby reducing a required space. Further, the buffer may allow reducing the pressure in the fluid lines compared to the accumulator. Thus, the buffer may be a good trade-off between the accumulator and the direct connection of the pumping chamber and the cylinder of the spring-seat with regard to functionality, cost and/or space requirements.

Further, the damper system may include a second one-way valve, e.g. a check valve, being arranged between the buffer and the cylinder of the spring seat. The one-way valve may be configured to stop the fluid in the cylinder of the spring seat from flowing backwards into the buffer, particularly during an extension stroke of the main damper.

The second one-way valve may be configured to stop the fluid in the cylinder of the spring seat from flowing backwards into the buffer, and may further allow pumping the fluid from the buffer into the cylinder of the spring-seat only when the pressure in the spring seat is lower than a certain value. The second one-way valve may be an electronic one-way valve. Additionally, or alternatively, this assembly may be configured to pump and store a portion of the fluid quantity required to raise the vehicle, such that the vehicle may be raised in fewer incremental steps than in case, when the pumping chamber and the cylinder of the spring seat are directly connected.

The first electronically controlled valve may be configured to reverse the fluid flow inside the pumping chamber at every stroke of the damper system, particularly of the main damper.

This may allow a more compact design of the damper system, thus, reducing the required space for the damper system and/or the reducing the complexity, particularly of an internal assembly of the pumping chamber. Further, the number of required valves may be reduced resulting in reduced maintenance costs.

According to another embodiment, the damper system may further include two linear valves configured to keep the fluid flow, particularly inside the pumping chamber, constant/continuous in one direction at every stroke of the damper system, particularly of the main damper.

This kind of fluid flow may cause less turbulences in the fluid flow than the reversed fluid flow. This means, the fluid flow may be more linear. Less turbulences may result in reduced losses allowing an increased amount of fluid flowing through the high pressure lines and/or low pressure lines etc., thereby improving an overall fluid flow. In other words, this kind of fluid flow may allow supplying more fluid with each stroke of the main damper compared to the reversed fluid flow. Such a fluid flow may be particularly useful for coil-over shock absorbers, this means, for damper systems having the spring assembly arranged substantially concentric to the main damper and surrounding the main damper. In particular, such fluid flow may be preferred for coil-over shock absorbers wherein the upper spring seat includes the cylinder and the piston. Thereby, the vehicle ride height, hence, the ground clearance may be adjusted by lowering and/or raising the height of the upper spring seat.

According to a second aspect, there is provided a method for changing, particularly for reducing and/or increasing, a ground clearance of a vehicle, the vehicle including a damper system according to the first aspect. Upon increasing the ground clearance of the vehicle, the method includes the steps of:

connecting the pumping chamber to the cylinder of the spring assembly by the first electronically controlled valve, pumping the fluid from the pumping chamber into the cylinder of the spring seat, to increase the ground clearance of the vehicle; and upon reducing the ground clearance of the vehicle, the method includes the steps of:

connecting the cylinder of the spring assembly to the low pressure reservoir by opening the second electronically controlled valve, draining the fluid from the cylinder to the low pressure reservoir, to reduce the ground clearance of the vehicle.

Thus, the method allows changing the ground clearance in a compact, cost-reduced, energy-efficient and relatively simple way.

Furthermore, the efficiency of the damper system allows using the overall energy saving, e.g. from lowering the vehicle, for other things than raising the vehicle, e.g. for extending an ultimate range of the vehicle.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may include one or more of a processor, a memory, a data interface, or the like.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF THE DRAWINGS

Exemplary embodiments of the disclosure will be described in the following with reference to the following drawings.

FIG. 4A shows a functional diagram of an exemplary embodiment of a damper system for changing a ground clearance of a vehicle.

FIG. 4B shows a functional diagram of an exemplary embodiment of a damper system for changing a ground clearance of a vehicle.

FIG. 5A shows a functional diagram of an exemplary embodiment of a damper system for changing a ground clearance of a vehicle.

FIG. 5B shows a functional diagram of an exemplary embodiment of a damper system for changing a ground clearance of a vehicle.

FIG. 6A shows a schematic view of an exemplary embodiment of a first electronically controlled vale of a damper system for changing a ground clearance of a vehicle.

FIG. 6B shows a schematic cross-sectional view of the first electronically controlled valve shown in FIG. 6A.

The figures are merely schematic representations and serve only to illustrate embodiments of the disclosure. Identical or equivalent elements are in principle provided with the same reference signs.

DESCRIPTION OF EMBODIMENTS

Figure 1:
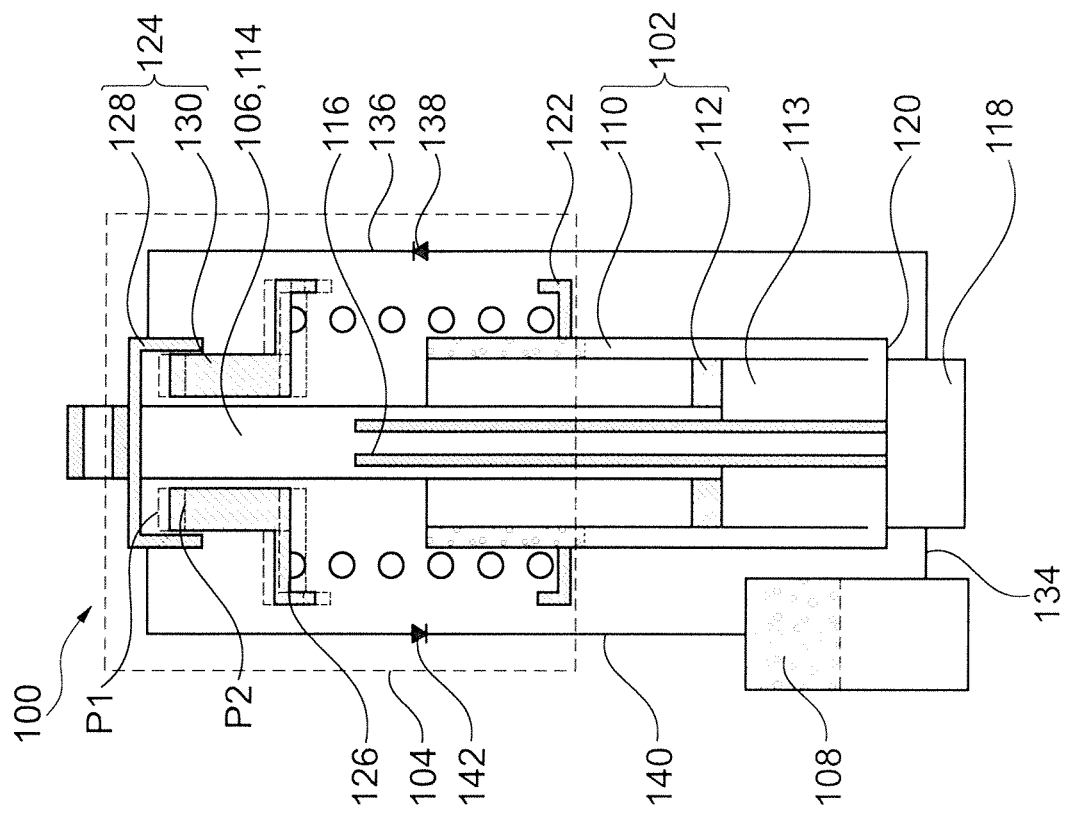
FIG. 1 shows a schematic view of an exemplary embodiment of a damper system for changing a ground clearance of a vehicle.
Figure 2:
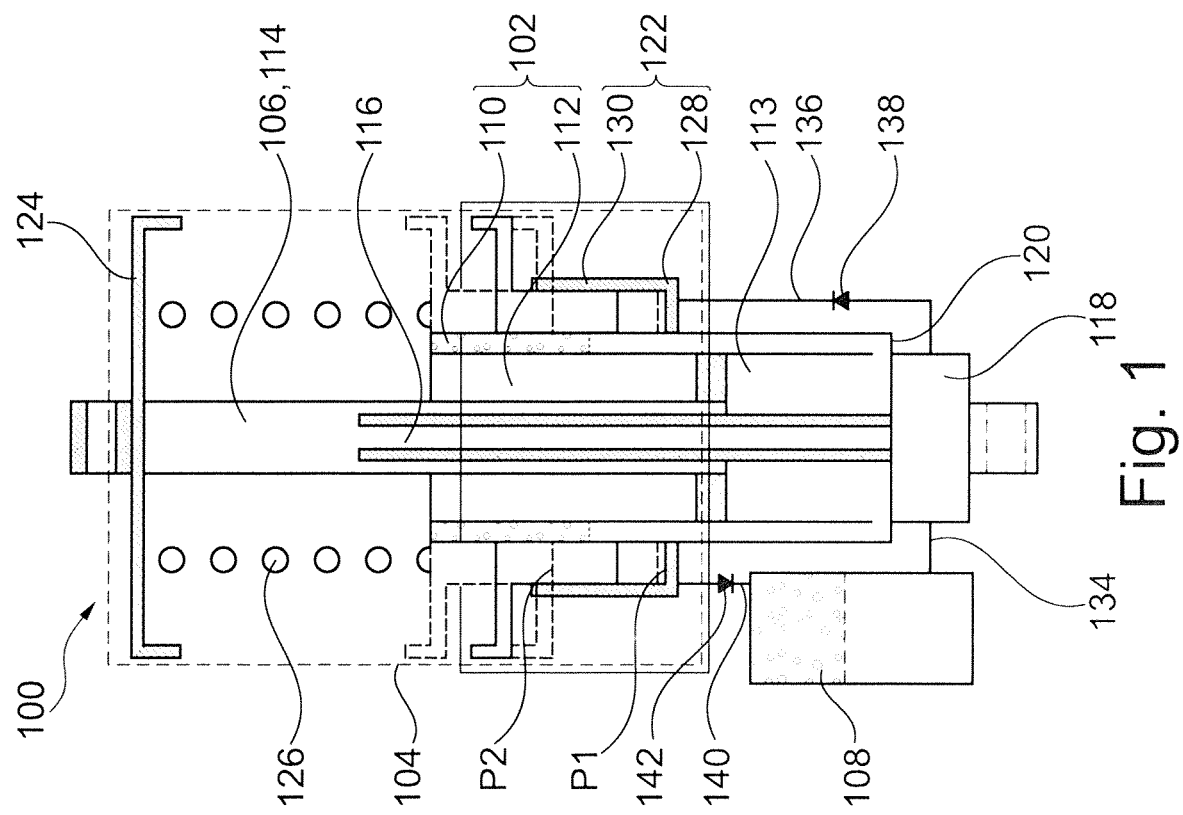
FIG. 2 shows a schematic view of another exemplary embodiment of a damper system for changing a ground clearance of a vehicle.

FIGS. 1 and 2 show different embodiments of a damper system 100 for changing a ground clearance of a vehicle (not illustrated) in a schematic sectional view. The damper system 100 corresponds to a coil-over shock absorber, and includes a main damper 102, a spring assembly 104, a pumping chamber 106, and a low pressure reservoir 108.

The main damper 102 includes a main damper tube 110 and a main damper piston 112 forming a main damper chamber 113. The main damper tube 110 is exemplarily shown as a twin tube. The main damper piston 112 is at least partly hollow, thereby including a cavity 114, which corresponds to the pumping chamber 106. Further, in the damper tube 110, there is a channel 116 fluidly connecting the pumping chamber 106 with a valve unit 118 arranged at a bottom 120 of the main damper tube 110.

The spring assembly 104 includes a lower spring seat 122 and an upper spring seat 124, between which a spring 126 is arranged. In FIG. 1, the lower spring seat 122 includes a cylinder 128 and a piston 130, which is movably accommodated in the cylinder 128 and the upper spring seat 124 is movable with the spring 126, whereas in FIG. 2, the upper spring seat 124 includes the cylinder 128 and the piston 130 and the lower spring seat 122 is movable with the spring 126. The piston 130 is steplessly adjustable in position between a first or lower position P1 and a second or upper position, wherein the first position P1 corresponds to a predefined minimum ground clearance of the vehicle and the second position P2 corresponds to a predefined maximum ground clearance of the vehicle.

The pumping chamber 106 is configured to pressurize a fluid, which is introduced into the pumping chamber 106 through the channel 116, with high pressure. Further, the pumping chamber 106 is fluidly connected to the cylinder 128.

The low pressure reservoir 108 is arranged adjacent to the main damper 102 and fluidly connected to the cylinder 128 as well as to the pumping chamber 106. The low pressure reservoir 108 is configured to at least temporarily store at least a part of the fluid with low pressure. Thus, all connection elements, e.g. channels, hoses etc., being fluidly connected with the low pressure reservoir can be referred to as "low pressure line". Connection elements, e.g. channels, hoses, etc., configured to guide the high pressurized fluid can be referred to as "high pressure lines". Some connections elements can be both, a low pressure line and a high pressure line, respectively, depending on the cycle of the main damper 102.

The valve unit 118 includes a first electronically controlled valve 132 (see FIGS. 3 to 5), which is configured to fluidly connect or couple the low pressure reservoir 108 and the pumping chamber 106 via a first low pressure line 134 at least during an extension stroke of the main damper 102, and/or to directly or non-directly connect or couple the pumping chamber 106 with the cylinder 128 via a first high pressure line 136 at least during a compression stroke of the main damper 102. The term "directly" means that no other component—except for valves—is arranged between the pumping chamber 106 and the cylinder 128 in the first high pressure line 136. The term "non-directly" means that at least one other component, other than a valve, is arranged between the pumping chamber 106 and the cylinder 128 in the first high pressure line 136.

Further, in the first high pressure line 136, there is arranged a first one-way valve 138, here exemplarily shown as a check valve, which is configured to stop the fluid from flowing backwards into the valve unit 118. In another (third) low pressure line 140 connecting the low pressure reservoir 108 and the cylinder 128, there is arranged a second electronically controlled valve 142, which, in a closed state, is configured to stop the fluid in the cylinder 128 from flowing into the low pressure reservoir 108. In an open state, the second electronically controlled valve 142 is configured to drain the fluid from the cylinder 128 into the low pressure reservoir 108, thereby lowering the pressure in the cylinder and thus, lowering the piston towards or into the first position P1 for reducing the ground clearance of the vehicle. The second electronically controlled valve 142 is exemplarily shown as a solenoid valve 142 (see FIGS. 3 to 5).

In the damper systems 100 according to FIGS. 1 and 2, a fluid flow inside the pumping chamber 106 is reversed with every stroke of the main damper 102. In particular, during an expansion stroke of the main damper 102, the fluid is drawn into the pumping chamber 106 through the channel 116, and during a compression stroke of the main damper 102, the fluid is forced out of the pumping chamber 106 through the channel 116. The damper system 100 as shown in FIG. 2 may also allow maintaining the fluid flow in a constant direction for the compression stroke as well as for the expansion stroke of the main damper 102. For achieving a fluid flow in one direction, there are additionally provided two linear valves (not illustrated), wherein a first one of the two linear valves is arranged at an entry where the fluid enters the pumping chamber 106 from the channel 116. For example, the first one of the two linear valves can be included in the valve unit 118. A second one of the two linear valves is arranged at an exit where the fluid is discharged from the pumping chamber 106 into the cylinder 128 of the upper spring seat 124. The two linear valves are each configured as a one-way valve, only allowing the fluid to flow in one direction independent of the stroke of the main damper 102.

Figure 3B:
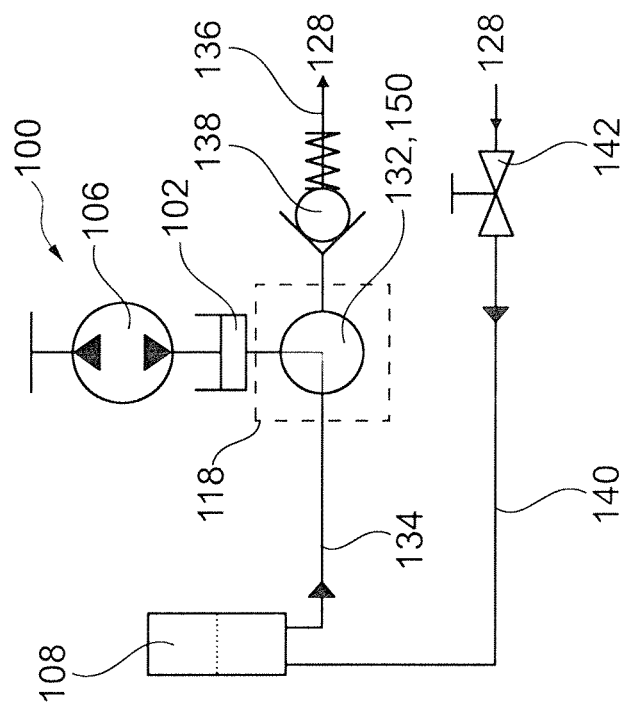
FIG. 3B shows a functional diagram of an exemplary embodiment of a damper system for changing a ground clearance of a vehicle.
Figure 3A:
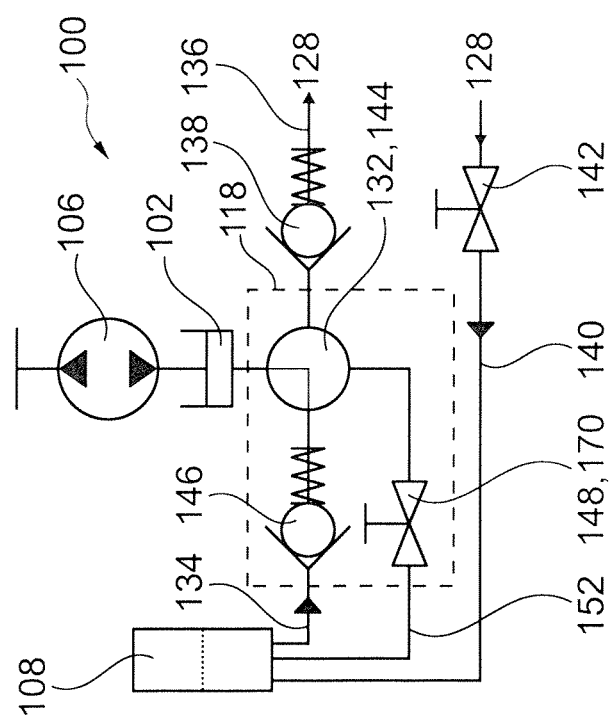
FIG. 3A shows a functional diagram of an exemplary embodiment of a damper system for changing a ground clearance of a vehicle.

FIGS. 3A and 3B show two different variants of an exemplary embodiment of the damper system 100 in a functional diagram. The two variants mainly differ from each other in the valve unit 118. In the embodiment shown in FIG. 3A, the valve unit 118 includes a mechanical valve 144, a one-way valve 146, and a solenoid valve 148, whereas in the embodiment shown in FIG. 3B, the valve unit 118 only includes a rotary valve 150.

With regard to FIG. 3A, the mechanical valve 144 corresponds to the first electronically controlled valve 132. The one-way valve 146 is a check valve, and is arranged in the first low pressure line 134 between the mechanical valve 142 and the low pressure reservoir 108. The check valve 146 is configured to stop the fluid in the pumping chamber 106 from flowing into the low pressure reservoir 108 and/or to allow the fluid to flow from the low pressure reservoir 108 into the pumping chamber 106.

The solenoid valve 148 is arranged in a second low pressure line 152 of the valve unit 118 also between the low pressure reservoir 108 and the mechanical valve 144. The solenoid valve 148, when being in a closed state, is configured to interrupt a fluid flow between the pumping chamber 106 and the low pressure reservoir 108 through the second low pressure line 152. Thus, when the solenoid valve 148 is in the closed state, a fluid flow between the low pressure reservoir 108 and the pumping chamber 106 is only allowed through the first low pressure line 134, and further, due to the one-way valve 146, only in the direction from the low pressure reservoir 108 to the pumping chamber 106. In an open state, the solenoid valve 148 allows a fluid flow in the second low pressure line 152 between the low pressure reservoir 108 and the pumping chamber 106. In particular, the solenoid valve 148 is configured to be in the closed state at least during a compression stroke of the main damper 102 and configured to be in the open position at least during an extension stroke of the main damper 102. In other words, the solenoid valve 148 is configured to be closed during a state of pumping, and is configured to be open during a pure damping state, in which no pumping is active. Thus, the solenoid valve 148 works as a bypass valve 170.

With regard to FIG. 3B, the rotary valve 150 corresponds to the first electronically controlled valve 132. The rotary valve 150 as the first electronically controlled valve 132 has its own drive unit, e.g. a motor, which enables to control the fluid flow with high precision. Therefore, the one-way valve 146 and the solenoid valve 148 (see FIG. 3A) are not needed in combination with the rotary valve 150. However, the valve unit 118 including the rotary valve 150 requires more space, and an increased amount of energy compared to the valve unit 118 including the mechanical valve 144, the one-way valve 146 and the solenoid valve 148.

Further, with regard to FIGS. 3A and 3B, the valve unit 118 is directly connected to the cylinder 128. In this embodiment, the damper system 100 uses a relative motion between a wheel of the vehicle and a chassis of the vehicle (both not illustrated) to pump the fluid from the pumping chamber 106 directly into the cylinder 128 during a compression stroke of the main damper 102. This is achieved by switching the first electronically controlled valve 132, namely the mechanical valve 144 in FIG. 3A, and the rotary valve 150 in FIG. 3B respectively, between the first high pressure line 136 during compression stroke of the main damper 102 and the first low pressure line 134 during the expansion stroke of the main damper 102, respectively. This causes the spring 126 to compress a fraction of the length more than it normally would during the compression stroke of the main damper 102 due to the piston 130 being raised. During the expansion stroke of the main damper 102, the spring 126 extends a fraction of the length more that it normally would, thereby increasing the ground clearance of the vehicle, which means, the vehicle is raised, e.g. to a normal ride height for urban driving. When the vehicle needs to be lowered, e.g. for highway driving, the fluid in the cylinder 128 is drained into the low pressure reservoir 108 by opening the second electronically controlled valve 148.

Thus, this embodiment allows eliminating the need of a high pressure accumulator, thereby improving a packaging efficiency and/or reducing production and/or maintenance costs. However, for generating the relative motion between the wheel and the chassis of the vehicle, the vehicle needs to be moving at least for a short distance during which the damping system 100 is able to pump a required amount of fluid from the pumping chamber 106 into the cylinder 128. Thus, there is a delay between the time, when the ground clearance needs to be increased and the time, when it is actually achieved. Further, the vehicle cannot be raised at standstill.

FIGS. 4A and 4B show two different variants of an exemplary embodiment of the damper system 100 in a functional diagram. The two variants mainly differ from each other in the valve unit 118. In the embodiment shown in FIG. 4A, the valve unit 118 includes the mechanical valve 144, the one-way valve 146, and the solenoid valve 148, whereas in the embodiment shown in FIG. 4B, the valve unit 118 only includes the rotary valve 150. Further, FIG. 4A substantially corresponds to FIG. 3A and FIG. 4B substantially corresponds to FIG. 3B, respectively, except for the connection between the pumping chamber 106 and the cylinder 128. In order to avoid repetition, only the differences are discussed below.

With regard to FIGS. 4A and 4B, a high pressure accumulator 154 is arranged in the first high pressure line 136 between the first one-way valve 138 and the cylinder 128. The high pressure accumulator 154 is configured to store a predefined amount of the fluid under high pressure, when the ground clearance of the vehicle is at a predefined minimum position, e.g., when the piston 130 is in the first positon P1. The predefined amount of fluid particularly corresponds to an amount of fluid, which is required to move the piston 130 from the first position P1 into the second position P2.

Further, another solenoid valve 156 is arranged between the accumulator 154 and the cylinder 128. The solenoid valve 156 is configured to be open during a compression stroke of the main damper 102 and configured to be closed during an expansion stroke of the main damper 102 to stop the fluid in the cylinder 128 from flowing backwards into the accumulator 154.

In this embodiment, the damper system 100 also uses the relative motion between the wheel and the chassis of the vehicle. Instead of directly pumping the fluid into the cylinder 128, according to this embodiment, the fluid is pumped into the accumulator 154, while the solenoid valve 156 is closed. This allows pumping and storing the fluid in the accumulator 154 while the piston 130 is in the first position P1, thus, when the ground clearance of the vehicle is at the predefined minimum position, e.g. during highway driving. When the vehicle needs to be raised, e.g. when the vehicle enters an urban driving scenario, the solenoid valve 156 is open and the piston 130 can be raised to the second position P2, thus, the ground clearance of the vehicle can be increased, particularly to the predefined maximum position immediately, without any delay and/or at standstill.

Further, since the fluid is stored under pressure in the accumulator 154, it is possible changing the ground clearance of the vehicle additionally for other reasons, e.g. for crash mitigation by lowering and/or raising the vehicle corners during imminent collision.

Due to the fluid being stored under high pressure in the accumulator 154, the fluid pressure in the damper system 100 according to this embodiment is higher than in the damper system 100 according to the embodiment described with regard to FIGS. 3A and 3B. Further, the solenoid valve 156, which corresponds to a third electronically controlled valve 156, between the accumulator 154 and the cylinder 128 is required. Thus, due to the additional components, the production and maintenance costs as well as the required space of the damper system 100 are increased. Further, because the pressure in the accumulator 154 and consequently in the fluid lines increases linearly in case of a spring-loaded accumulator, and exponentially in cased of compressed air, respectively, the resulting damping forces will not be constant and thus, effect ride, comfort and/or handling. Thus, an adaptive damping at the first electronically controlled 132 valve may be required to compensate the differences in the resulting damping forces.

FIGS. 5A and 5B show two different variants of an exemplary embodiment of the damper system 100 in a functional diagram. The two variants mainly differ from each other in the valve unit 118. In the embodiment shown in FIG. 5A, the valve unit 118 includes the mechanical valve 144, the one-way valve 146, and the solenoid valve 148, whereas in the embodiment shown in FIG. 5B, the valve unit 118 only includes the rotary valve 150. Further, FIG. 5A substantially corresponds to FIG. 4A and FIG. 5B substantially corresponds to FIG. 4B, respectively, except for the connection between the pumping chamber 106 and the cylinder 128. In order to avoid repetition, only the differences are discussed below.

With regard to FIGS. 5A and 5B, a buffer 158 is arranged in the first high pressure line 136 between the first one-way valve 138 and the cylinder 128. The buffer 158 is configured to store a predefined amount of the fluid under high pressure, when the ground clearance of the vehicle is at a predefined minimum position, e.g., when the piston 130 is in the first positon P1. The predefined amount of fluid particularly corresponds to a portion of the entire amount of fluid, which is required to move the piston 130 from the first position P1 into the second position P2.

Further, a second one-way valve 160 is arranged between the buffer 158 and the cylinder 128. The second one-way valve 160 is configured to be open during a compression stroke of the main damper 102 and configured to be closed during an expansion stroke of the main damper 102 to stop the fluid in the cylinder 128 from flowing backwards into the buffer 158.

In this embodiment, the damper system 100 also uses the relative motion between the wheel and the chassis of the vehicle. Instead of pumping the fluid into the accumulator 154, according to this embodiment, the fluid is pumped into the buffer 158. In contrast to the embodiment describe with regard to Figured 3A and 3B, during the compression stroke of the main damper 102, the fluid is pumped into the buffer 158, and during the expansion stroke of the main damper 102, the fluid is pumped from the buffer 158 into the cylinder 128. The buffer 158 corresponds to an accumulator being smaller than the accumulator 154. This reduces the space required for the damper system 100 and further allows reducing the pressures in the fluid lines, because forces generating during the expansion stroke are lower than in the embodiment as described with regard to FIGS. 4A and 4B as the spring 126 and a mass of unsprung parts, such as a wheel, a suspension assembly etc., do part of the work.

Thus, in this embodiment, the second one-way valve 160 can be used instead of the solenoid valve 156, such that the fluid from the buffer 158 is pumped into the cylinder 128 only when the pressure in the cylinder 128 is lower than a predefined value. Further, by using an electronic one-way valve as the second one-wax valve 160, this embodiment allows pumping and storing a portion of the entire amount of fluid required such that the vehicle can be raised, or, in other word, the piston 130 can be raised, in fewer incremental steps than the embodiment as described with regard to FIGS. 3A and 3B. Regarding functionality, cost and space requirement, this embodiment corresponds to a good trade-off between the embodiment as described with regard to FIGS. 3A and 3B and the embodiment as described with regard to FIGS. 4A and 4B.

FIGS. 6A and 6B show the mechanical valve 144, which can be used as the first electronically controlled valve 132. The mechanical valve 144 includes at least three connection ports 162: a connection port 164 configured to fluidly connect the pumping chamber 106 with the low pressure reservoir 108 for a fluid flow from the low pressure reservoir 108 into the pumping chamber 106; a connection port 166 configure to fluidly connect the pumping chamber 106 with the low pressure reservoir 108 via the bypass valve 170 for a fluid flow from the pumping chamber 106 to the low pressure reservoir 108 and vice versa; and a connection port 168 configured to fluidly connect the pumping chamber 106 either directly or non-directly, with the cylinder 128.

In general, the damper system 100 is configured to draw the fluid into the pumping chamber 106 during the expansion stroke of the main damper 102, and during the compression stroke of the main damper 102, the fluid is forced out of the pumping chamber 106, while the main damper 102 provides damping during both, the compression and the expansion stroke of the main damper 102.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A damper system for changing a ground clearance of a vehicle, the damper system comprising:
    a main damper comprising a main damper chamber;
    a spring assembly comprising:
    a spring;
    a lower spring seat; and
    an upper spring seat;
    the spring being arranged between the lower spring seat and the upper spring seat;
    wherein one of the lower spring seat and the upper spring seat comprises a cylinder and a piston being movably accommodated in the cylinder, and the other one of the lower spring seat and the upper spring seat is movable with the spring;
    wherein the piston is adjustable in position between a first position (P1) and a second position (P2), the first position (P1) corresponding to a predefined minimum ground clearance and the second position (P2) corresponding to a predefined maximum ground clearance;
    a pumping chamber accommodated in the main damper and configured to increase the pressure of a fluid to a high pressure; and
    a lower pressure reservoir configured to reduce the pressure of a fluid to a low pressure and at least temporarily store at least a part of the fluid having low pressure;
    wherein the pumping chamber is connected to a valve unit being arranged at a bottom of the main damper, the valve unit at least comprising a first electronically controlled valve, wherein the first electronically controlled valve is configured to at least:
    connect/couple the pumping chamber with the low pressure reservoir via a first low pressure line during an expansion stroke of the main damper; and
    directly or non-directly connect/couple the pumping chamber with the cylinder of the spring assembly via a high pressure line during a compression stroke of the main damper;
    wherein a first one-way valve is arranged in the high pressure line configured to stop the fluid from flowing backwards into the valve unit; and
    wherein the low pressure reservoir is connected/coupled to the cylinder of the spring assembly by a second electronically controlled valve.

2. The damper system according to claim 1, wherein the first electronically controlled valve is a mechanical valve, and the valve unit further comprises a one-way valve arranged in the first low pressure line connecting the low pressure reservoir and the mechanical valve and configured to stop the fluid in the pumping chamber from flowing backwards into the low pressure reservoir, and a solenoid valve arranged in a second low pressure line connecting the low pressure reservoir and the mechanical valve and configured to be closed to increase the ground clearance of the vehicle, and configured to be open to maintain the ground clearance at a predefined level.

3. The damper system according to claim 1, wherein the first electronically controlled valve is a rotary valve.

4. The damper system according to claim 1, wherein the first electronically controlled valve is configured to be switchable between the high pressure line and the low pressure line during compression and rebound stroke of the damper system, respectively.

5. The damper system according to claim 1, wherein the second electronically controlled valve is configured to connect the cylinder with the low pressure reservoir for lowering the ground clearance of the vehicle.

6. The damper system according to claim 1, wherein the first electronically controlled valve is configured to directly connect the cylinder with the pumping chamber for increasing the ground clearance of the vehicle.

7. The damper system according to claim 1, further comprising:
    a high pressure accumulator configured to store a predefined amount of the fluid under pressure;
    wherein the accumulator is arranged in the high pressure line between the first one-way valve and the cylinder of the spring assembly.

8. The damper system according to claim 7, wherein the predefined amount of the fluid corresponds to an amount of the fluid required to move the piston from the first position (P1) to the second position (P2).

9. The damper system according to claim 7, further comprising a solenoid valve being arranged between the accumulator and the cylinder of the spring assembly and configured to be closed to stop the fluid in the cylinder from flowing backwards into the accumulator and/or configured to be open to allow the fluid flowing from the accumulator into the cylinder.

10. The damper system according to claim 1, further comprising:
    a buffer configured to store a predefined amount of the fluid under pressure;
    wherein the buffer is arranged in the high pressure line between the first one-way valve and the cylinder of the spring assembly.

11. The damper system according to claim 10, wherein the predefined amount of fluid corresponds to a portion of the entire amount of fluid being required to move the piston from the first position (P1) to the second position (P2).

12. The damper system according to claim 10, further comprising a second one way valve being arranged between the buffer and the cylinder of the spring assembly and configured to stop the fluid in the cylinder from flowing backwards into the buffer.

13. The damper system according to claim 1, wherein the first electronically controlled valve is configured to reverse the fluid flow inside the pumping chamber at every stroke of the damper system.

14. The damper system according to claim 1, further comprising two linear valves configured to keep the fluid flow constant in one direction at every stroke of the damper system.

15. A method for changing the ground clearance of the vehicle comprising the damper system according to claim 1, wherein, upon increasing the ground clearance of the vehicle, the method comprises steps of:
    connecting the pumping chamber to the cylinder of the spring assembly by the first electronically controlled valve;

pumping the fluid from the pumping chamber into the cylinder to increase the ground clearance of the vehicle; and upon reducing the ground clearance of the vehicle, the method comprises the steps of:

connecting the cylinder of the spring assembly to the low pressure reservoir by opening the second electronically controlled valve; and draining the fluid from the cylinder to the low pressure reservoir to reduce the ground clearance of the vehicle.

* * * * *